G. Rich,
Motor.

N° 77,322. Patented Apr. 28, 1868.

Witnesses.
J. C. Heuker
Erastus Smith

Inventor.
Granvil Rich

UNITED STATES PATENT OFFICE.

GRANVIL RICH, OF SMITHVILLE, MISSOURI.

IMPROVEMENT IN MECHANICAL MOVEMENTS.

Specification forming part of Letters Patent No. 77,322, dated April 28, 1868.

*To all whom it may concern:*

Be it known that I, GRANVIL RICH, of Smithville, in the county of Clay and State of Missouri, have invented a new and useful Improvement in Mechanical Movements; and I do hereby declare that the following is a full, clear, and exact description thereof, reference being had to the annexed drawings.

The nature of my invention consists in so constructing my machine that by operating the levers alternately it can be kept continuously wound up.

Figure 2:
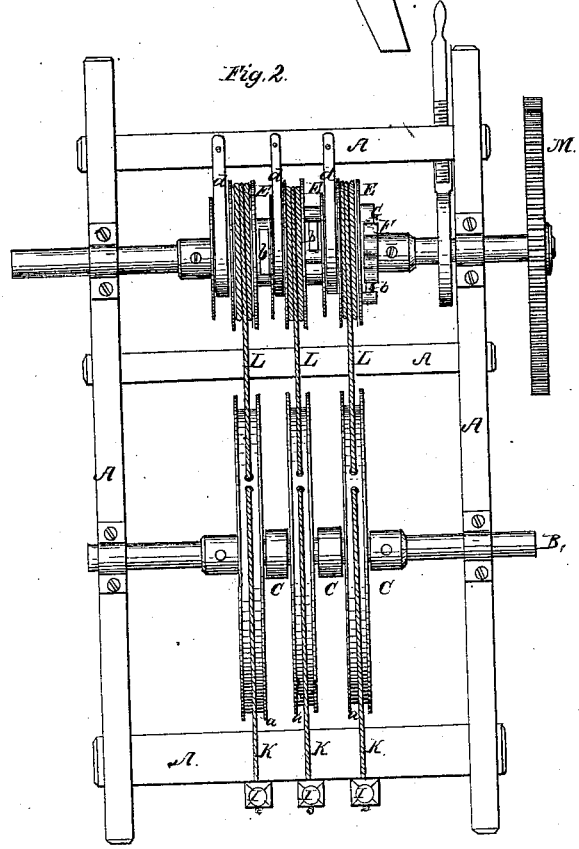
Figure 3:
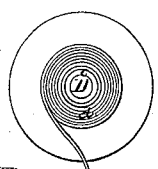
Figure 4:
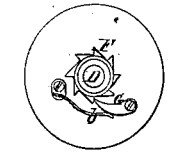

The construction of my machine is as follows, viz: I construct a frame, A, of any convenient size and shape in order to receive the machinery or movement to be placed thereon. Upon the frame A, I place a shaft, B, and upon this shaft I place a number of wheels, C, of any convenient size and any desired number to correspond with the size and power desired in the movement. These wheels are placed loosely on said shaft, so that they can revolve freely on the same without moving it. These wheels are made with a groove or band-race on their periphery, as seen at *a*, Figure 2. I place on said frame A at any convenient distance in front of shaft B a shaft, D, and on this shaft I place wheels E equal in number to the wheels on shaft B. These wheels E are constructed with grooves on their periphery to correspond with the grooves in wheels C, and these wheels E are so placed on their shaft D as to bring their grooves fairly opposite to the grooves in the corresponding wheels on shaft B, respectively. At one side of each of these wheels E I place rigidly on the shaft D a ratchet, F, and upon the same side of said wheels and attached thereto are pawls G, so placed that they will fall upon the periphery of the ratchet, and just over or outside of said pawls I place small springs *b* in any convenient manner, so that they by pressing upon said pawls will keep them constantly in contact with their ratchets, respectively. This arrangement will allow the said wheels to revolve in one direction without turning the shaft; but when they move in a contrary direction the pawls will take hold on the teeth of the ratchets and carry them around with them, and as the ratchets are rigidly placed on the shaft D it must revolve with them. On the opposite side of each of the wheels E from the ratchets, respectively, I form a hub, *c*, around which to coil the main-spring *d*, as shown in Fig. 3. This spring is attached at its inner end to the said hub *c* and at its outer end to the frame A, as seen in Fig. 2. I attach to the frame A in any convenient way a series of levers, I, equal in number to the wheels on shaft D and directly in rear of them, so that each lever will be exactly in line with the groove of its corresponding wheel. These levers are attached at their lower ends to the frame A in any convenient manner to work on their attaching devices, they serving as fulcrums for the levers. At a point on these levers about on a horizontal line with the top or apex of the wheels C, I attach a rope or strap, K, to each, the other end of the same being attached to the wheel C in the bottom of the grooves of the same. This rope or strap is of such length that when the lever is in a vertical position it will extend from the lever over the apex of the wheel and partially around the same, so that when the lever is drawn down to a horizontal position the wheel is turned by the strain on the said rope toward the lever. I connect each of the wheels C on shaft B with their fellows or mates E on shaft D, respectively, by means of the ropes or straps L, which are attached to the said wheels at the bottoms of their grooves, and said ropes or straps pass over the top and partially around said wheels. The springs *d*, which are coiled around the hubs *c* of the wheels E, are so strained and the ropes or straps so placed on their respective wheels as that their respective levers are drawn up forcibly by the power of the said springs to a vertical position.

Figure 1:
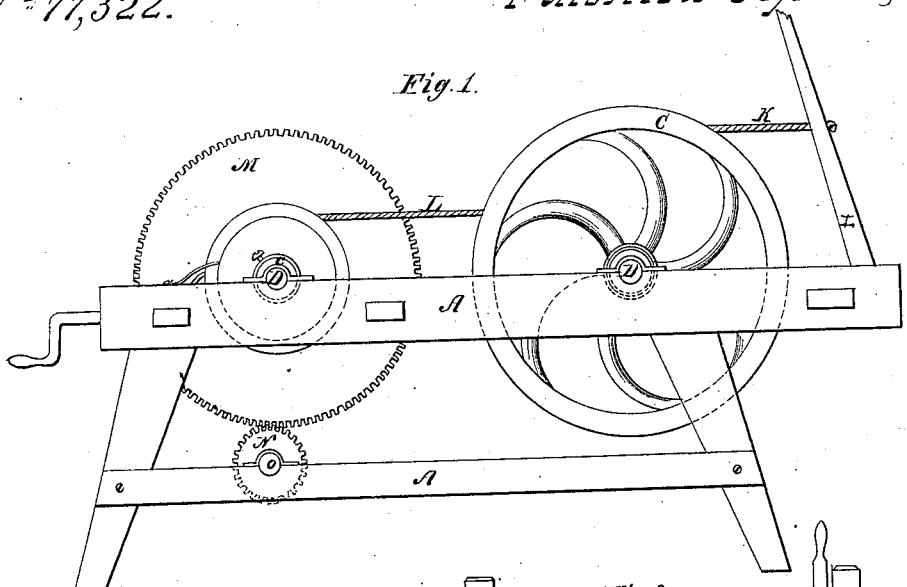

The operation of the above-described machine is as follows, viz: When any one of the levers I is forced down from a vertical to a horizontal position it will, by means of its connection by rope or strap K with the wheel C, cause it to turn toward said lever, and as the wheel C is attached to the wheel E by the rope or strap L, as shown, the turning of C must produce a corresponding motion in E, and as the wheel E turns it carries with it its pawl G, which, when the move in the direction due to the forcing down of the lever I passes freely over the teeth of the ratchet F without taking hold on them, and as one end of the spring *d* is attached to the hub *c* of the wheel E, and the spring coiled around said hub and its other end fastened to the frame A, as shown in Figs. 1 and 2, it follows that by the motion of the lever and wheels, as just mentioned, the spring $d$ is wound up, and when the lever is released and allowed to resume its vertical position the said spring, being on a strain, is drawing on hub, $c$, to which it is attached, and thus it is rotated, and it being a part of the wheel E the latter turns with the former, and the pawl G being attached to the other side of the wheel E it is carried around with the wheel, and in rotating in the direction now described it takes hold on the teeth of the ratchet F and turns it, and it being rigidly attached to the shaft D the latter is rotated also. On one of the outer ends of this shaft D is shown a spur-wheel, M, which gears into the pinion N on shaft O, showing how the power of my machine may be applied to driving any kind of machinery; but it is evident that the power may be taken from the shaft D in any convenient known way.

In order to increase the effective power of my machine, I place a series of wheels, C and E, on their respective shafts, and attach levers I to correspond therewith, and all the attachments, as described, attached to each of the series or sets of devices, as shown.

Having thus fully described my machine, what I claim as my invention, and desire to secure by Letters Patent, is—

1. The combination of the lever I, rope or strap K, wheel C, rope or strap L, and wheel E, all as shown and described.

2. The combination of the wheel E, constructed with the hub $c$ on one side, and having on the other side a pawl, G, and spring $b$, with the ratchet-wheel F, all as shown and described.

3. The combination of the wheel E, constructed with the hub $c$, pawl G, and springs $d$ and $b$, all as shown and described.

GRANVIL RICH.

Witnesses:
  T. C. THEAKER,
  ERASTUS SMITH.